United States Patent [19]

Honma et al.

[11] Patent Number: 5,402,276
[45] Date of Patent: Mar. 28, 1995

[54] MAGNETIC DISK DEVICE

[75] Inventors: Satoru Honma, Osaka; Kazuoki Otani, Yao; Yukinori Ohtani, Iwate, all of Japan

[73] Assignee: Matsushita Electric Industrial Co., Ltd., Osaka, Japan

[21] Appl. No.: 61,241

[22] Filed: May 17, 1993

[30] Foreign Application Priority Data

May 22, 1992 [JP] Japan .................................. 4-131168

[51] Int. Cl.$^6$ ................................................ G11B 5/09
[52] U.S. Cl. .......................................... 360/51; 360/48
[58] Field of Search ........................ 360/32, 46, 48, 51, 360/53, 72.02, 77.08

[56] References Cited

U.S. PATENT DOCUMENTS

| 4,748,623 | 5/1988 | Fujimoto | 370/100 |
| 4,805,046 | 2/1989 | Kuroki et al. | 360/51 X |
| 4,858,035 | 8/1989 | Hikawa | 360/51 |
| 4,862,443 | 8/1989 | Tsuji et al. | 360/48 X |

Primary Examiner—Donald Hajec
Assistant Examiner—Thien M. Le
Attorney, Agent, or Firm—Stevens, Davis, Miller & Mosher

[57] ABSTRACT

A magnetic disk device using a pattern in which a plurality of pulse trains functioning as a demodulation start synchronization mark, having one-half a frequency of a clock synchronization PLOSYNC but having mutually different pulse numbers, are dispersedly arranged in pulse trains having the same frequency as that of the clock synchronization PLOSYNC, and also using, as a unit for detecting the demodulation start synchronization mark, a unit which confirms coincidence of the pattern in a time unit of one period of the pulse trains of the clock synchronization PLOSYNC and recognizes the demodulation start synchronization mark by complete coincidence of the demodulation start synchronization mark with the pattern or by coincidence of at least a predetermined number of the demodulation start synchronization marks with the pattern.

7 Claims, 5 Drawing Sheets

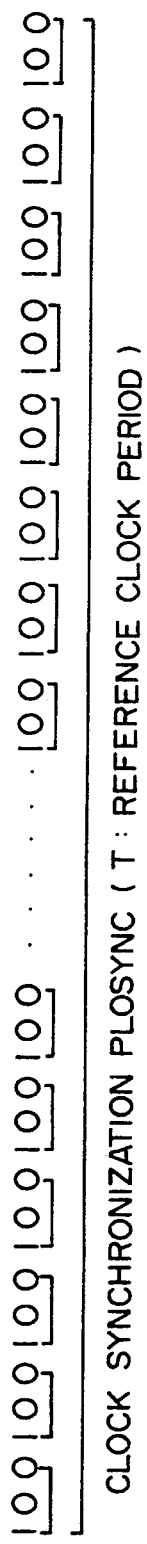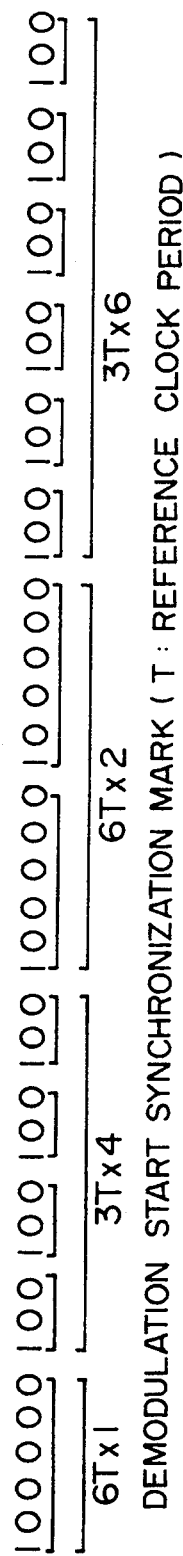

MAGNETIC DISK DEVICE

BACKGROUND OF THE INVENTION

This invention relates to a magnetic disk device such as a floppy disk, a hard disk, etc., used as an external storage of a computer, or the like.

FIG. 7 depicts the construction of a data read circuit in a magnetic disk device according to the prior art. In the drawing, reference numeral 1 denotes a clock synchronization circuit, 2 is a demodulation start synchronization mark detection circuit, 3 is a demodulation circuit, and 4 is an error correction circuit.

FIG. 8 shows a data field of a sector format in the conventional magnetic disk data read circuit described above. In the drawing, reference numeral 5 denotes a PLO SYNC for clock synchronization, 6 is a demodulation start synchronization mark, 7 is a data recording area, and 8 is an error correction parity byte. The data recording area 7 and the error correction parity byte 8 are modulated to 1-7 RLLC (Run Length Limited Code), 2-7 RLLC, etc.

Next, the operation of the prior art example described above will be explained. In FIGS. 7 and 8, the clock synchronization circuit 1 inputs a reproduction pulse a obtained by digitizing a reproduction signal, establishes clock synchronization by the use of the clock synchronization PLO SYNC 5, and outputs a to-be-demodulated pulse b.

The to-be-demodulated pulse b is inputted to the demodulation start synchronization mark detection circuit 2 and to the demodulation circuit 3. Detecting the demodulation start synchronization mark 6, the demodulation start synchronization mark detection circuit 2 gives a demodulation start instruction c to the demodulation circuit 3 to start demodulation. The demodulation circuit 3 outputs a demodulation data d obtained by demodulating the data recording area 7 and the error correction parity byte 8 to NRZ (Non-Return-to-Zero) and inputs it to the error correction circuit 4. The error correction circuit 4 corrects any error of the demodulation data d by the use of the error correction parity byte 8, and outputs reproduction data e of the data recording area 7.

The conventional magnetic disk device uses a specific pattern having a different frequency from that of the clock synchronization PLO SYNC 5 as the demodulation start synchronization mark 6, and utilizes complete coincidence of patterns for the detection of the demodulation start synchronization mark 6.

According to the construction described above, however, if any error exists in the detection of the demodulation start synchronization mark 6, the sector proves to be a defective sector in both of the cases where no error exists in the data recording area 7 and where an error exists in the data recording area 7 but such an error can be corrected.

SUMMARY OF THE INVENTION

To solve the problem with the prior art described above, the present invention aims at providing a magnetic disk device which minimizes the occurrence of a defective sector due to detection defect of the demodulation start synchronization mark.

To accomplish the object described above, the magnetic disk device according to the present invention uses a pattern in which a plurality of pulse trains functioning as a demodulation start synchronization mark, having one-half a frequency of a clock synchronization PLOSYNC but having mutually different pulse numbers, are dispersedly arranged in pulse trains having the same frequency as that of the clock synchronization PLOSYNC the device includes means for detecting the demodulation start synchronization mark, which confirms coincidence of the pattern in a time unit of one period of the pulse trains of the clock synchronization PLOSYNC and recognizes the demodulation start synchronization mark by complete coincidence of the demodulation start synchronization mark with the pattern or by coincidence of at least a predetermined number of the demodulation start synchronization marks with the pattern.

According to the present invention, the means for detecting the demodulation start synchronization mark described above includes means which permits a bit shift of one bit in front, and at the back, of a reproduction pulse at a frequency change position in the demodulation start synchronization mark.

According to the construction described above, a detection failure ratio of the demodulation start synchronization mark due to partial fall-off of the demodulation start synchronization mark can be drastically reduced. Consequently, the occurrence of a sector being deemed defective resulting from detection failure of the demodulation start synchronization mark can be reduced to minimum.

Since the construction described above can drastically reduce the detection failure ratio of the demodulation start synchronization mark due to the peak shift, the occurrence of the defective sector resulting from detection failure of the demodulation start synchronization mark can be reduced to minimum.

BRIEF DESCRIPTION OF THE DRAWINGS

FIG. 3A is a diagram showing a correspondence relation between NRZ and 2-7 RLLC of PLOSYNC in the first embodiment of the present invention;

FIG. 3B is a diagram of a demodulation start synchronization mark pulse train in the first embodiment of the present invention;

DESCRIPTION OF THE PREFERRED EMBODIMENTS

Figure 1:
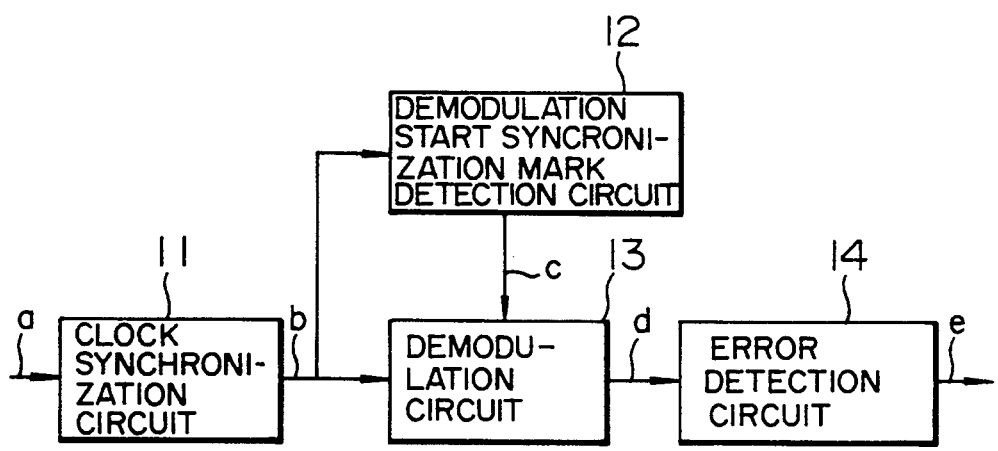
FIG. 1 is a block diagram of a data read circuit of a magnetic disk device according to the first embodiment of the present invention.

Hereinafter, the first embodiment of the present invention will be described where 2-7 RLLC is used as a modulation/demodulation system for a data memory area and the error correction parity byte, by way of example. FIG. 1 shows the construction of a data read circuit in a magnetic disk device in this embodiment. Reference numeral 11 denotes a clock synchronization circuit; 12 is a demodulation start synchronization mark detection circuit; 13 is a demodulation circuit; and 14 is an error correction circuit.

Figure 2:
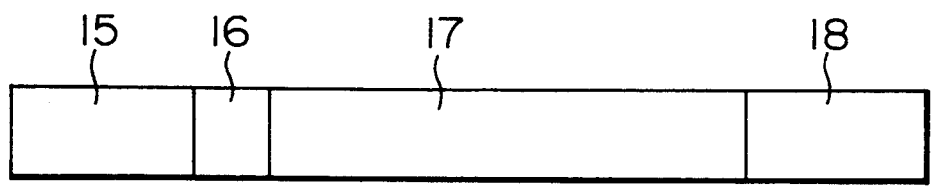
FIG. 2 is a data field diagram of a sector format in the first embodiment of the present invention.

FIG. 2 shows a data field of a sector format in the first embodiment. In FIG. 2, reference numeral 15 denotes a clock synchronization PLOSYNC having a 9-byte length; 17 is a data recording area having a 512-byte length; and 18 is an error correction parity byte having a 32-byte length.

The clock synchronization PLOSYNC 15 is a pulse train of 48 pulses having a period of 3T (where T is a reference clock period) as shown in FIG. 3A. The demodulation start synchronization mark 16 is a pulse train having one 6Ts, four 3Ts, two 6Ts and six 3Ts from the leading edge in the order named, as shown in FIG. 3B.

Figure 4:
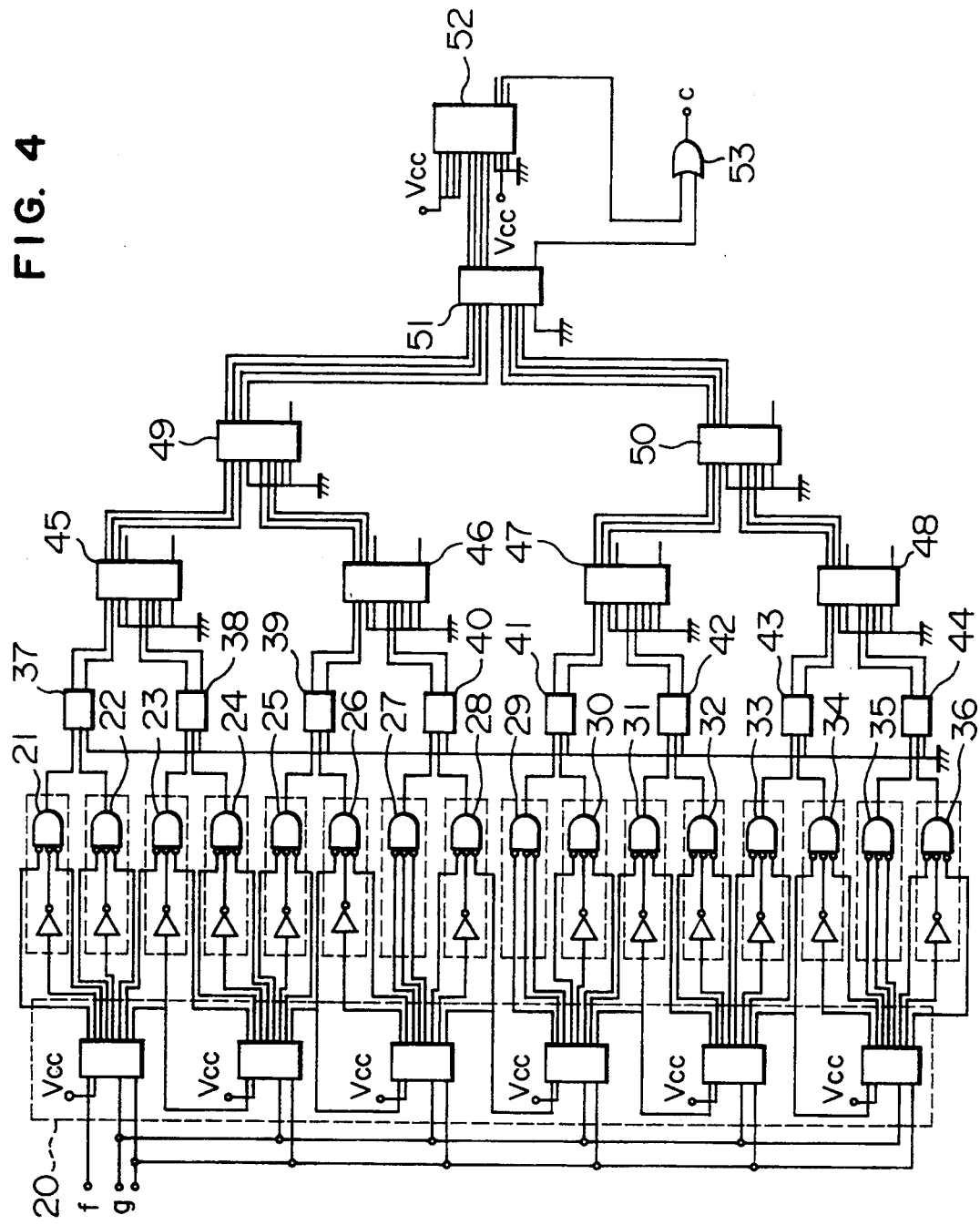
FIG. 4 is a circuit diagram of a demodulation start synchronization mark detection circuit in the first embodiment of the present invention.

FIG. 4 shows the construction of the demodulation start synchronization mark detection circuit 12 in the embodiment described above. Reference numeral 20 denotes a 48-bit shift register; 21 to 36 are 3-bit comparators; 37 to 44 are 1-bit full adders; 45 to 48 are 2-bit full adders; 49 and 50 are 3-bit full adders; 51 is a 4-bit full adder; 52 is a 4-bit comparator; and 53 is an OR gate.

Next, the operation of this embodiment will be explained. In FIG. 1, the clock period circuit 11 inputs a reproduction pulse a obtained by digitizing a reproduction signal, establishes clock synchronization using the clock synchronization PLOSYNC and outputs a to-be-demodulated pulse b. The to-be-demodulated pulse b is inputted to the demodulation start synchronization mark detection circuit 12 and to the demodulation circuit 13. Detecting the demodulation start synchronization mark 16, the demodulation circuit synchronization mark detection circuit 12 gives a demodulation start instruction c to the demodulation circuit 13 and lets it start demodulation. The demodulation circuit 13 outputs a demodulation data d generated by demodulating the data recording area 17 and the error correction parity byte 18 to the NRZ, and inputs the demodulation data d to the error correction circuit 14. The error correction circuit 14 corrects the error of the demodulation data d, if any, by the use of the error correction parity byte 18, and outputs a reproduction data e of the data recording area 17.

Next, the operation of the demodulation circuit synchronization mark detection circuit 12 will be explained with reference to FIG. 4. In FIG. 4, the to-be-demodulated data f and its synchronization clock g are inputted to the 48-bit shift register 20. Sets of register outputs each consisting of three outputs among the forty-eight register outputs of the 48-bit shift register 20 are sequentially inputted to the 3-bit comparators 21 to 36, respectively. Whenever clocks advance one by one, the outputs are compared with the pattern of the 48-bit demodulation start synchronization mark for every 3bits by the sixteen 3-bit comparators 21 to 36, and the coincidence outputs of two each of these sixteen 3-bit comparators 21 to 36 are inputted to the eight 1-bit full adders 37 to 44, respectively. The full adders 37 to 51 calculate the sums, respectively, and obtain the coincidence number of the sixteen 3-bit comparators 21 to 36. The sum output of the 4-bit full adder 51 at the final stage is inputted to the 4-bit comparator 52. The carry output of the 4-bit full adder 51 (which output becomes active when all the sixteen 3-bit comparators 21 to 36 are coincident with one another) is inputted to the OR gate 53. The 4-bit comparator 52 compares the sum input value from the 4-bit full adder 51 with the real number "15", and inputs the coincidence output to the OR gate 53. The OR gate 53 outputs the carry output of the 4-bit full adder 51 or the coincidence output of the 4-bit comparator 52 as the demodulation start instruction c. Accordingly, 48 bits of the to-be-demodulated data f are checked for each clock of the clock synchronization POLSYNC 15, and the demodulation start instruction c becomes active when at least 15 sets of 16 sets obtained by dividing the 48 bits of the to-be-demodulated data f by 3 bits coincide with the demodulation start synchronization mark.

Figure 6:
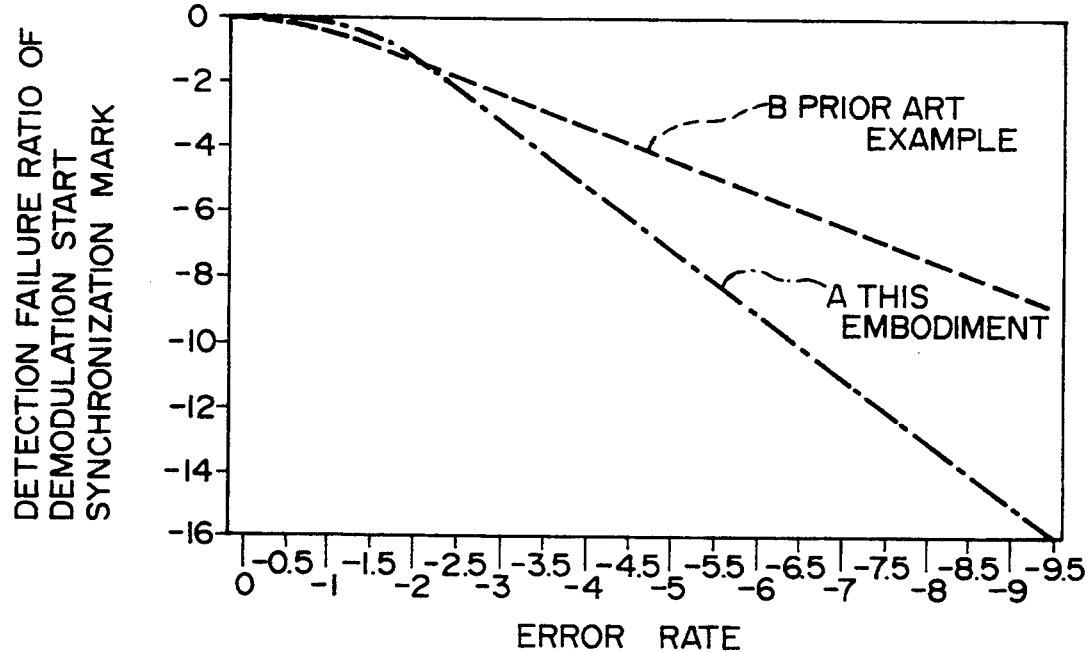
FIG. 6 is a characteristic diagram showing detection failure ratios of the demodulation start synchronization marks in the present invention and in the prior art example.
Figure 7:
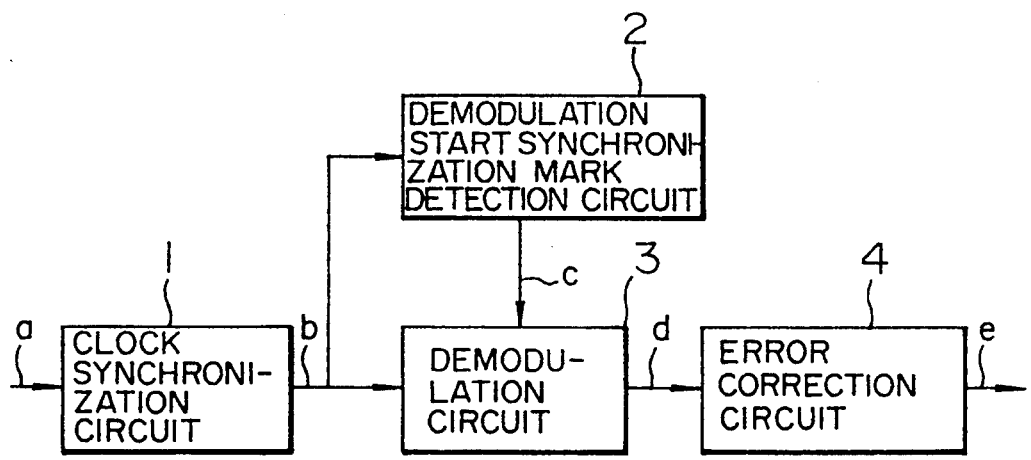
FIG. 7 is a block diagram of a data read circuit of a magnetic disk device according to the prior art.
Figure 8:
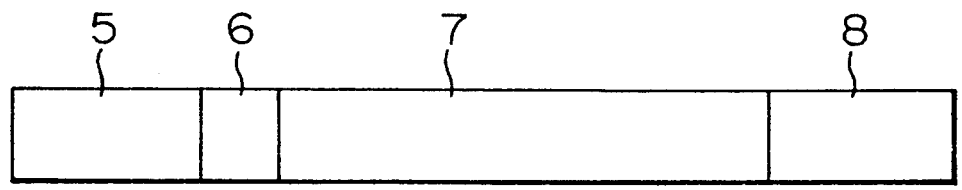
FIG. 8 is a data field diagram of a conventional sector format.

As described above, the magnetic disk device according to this embodiment employs the 2-7 RLLC demodulation system for the recording/reproduction of data, and uses the pattern shown in FIG. 3B functioning as the demodulation start synchronization mark. As means for detecting the demodulation start synchronization mark, the magnetic disk device uses the demodulation start synchronization mark detection circuit 12 which checks 48 bits of the to-be-demodulated data f for each clock of the synchronization clocks and recognizes the demodulation start synchronization mark when at least 15 out of 16 sets obtained by dividing the 48 bits of the to-be-demodulated data f by 3 bits coincide with the demodulation start synchronization mark. Owing to this detection circuit 12, the detection failure ratio of the demodulation start synchronization mark, or in other words, the ratio of occurrence of detective sector resulting from failure of demodulation, describes a curve indicated by a one-dot-chain line A shown in FIG. 6. In contrast, the ratio of occurrence of the detective sector resulting from failure of demodulation according to the prior art describes a curve B represented by a dotted line B in FIG. 6. Since the device is generally used at an error ratio of below $10^{-4}$, this embodiment can drastically improve the error rate in comparison with the prior art.

Figure 5:
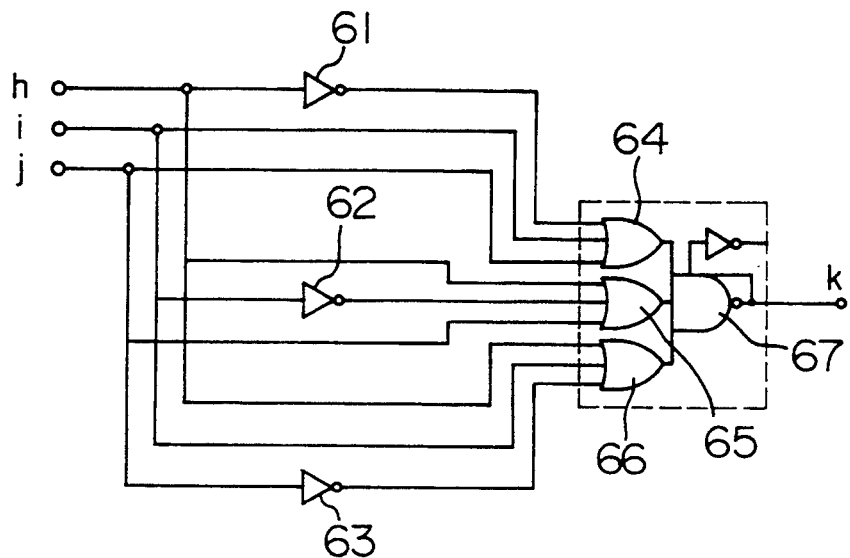
FIG. 5 is a partial circuit diagram of a demodulation start synchronization mark detection circuit in the second embodiment of the present invention.

Next, the second embodiment of the present invention will be explained with reference to FIG. 5. In this second embodiment, the 3-bit comparators 26, 28, 30, 34 and 36 in the demodulation start synchronization mark detection circuit of the first embodiment shown in FIG. 4 are replaced by a peak shift permission 3-bit comparator circuit shown in FIG. 5. In FIG. 5, reference numerals 61 to 63 denote inverter gates; 64 to 66 are OR gates; and 67 is a NAND gate. Symbol h represents an input 1 for connection of a shift register output, i is an input 2 for connecting the shift register output, j is an input 3 for connecting the shift register output, and k is an output for connecting an adder input.

The operation of this embodiment is the same as that of the first embodiment with the exception of the operation of the 3-bit comparators 26, 28, 30, 34, 36 of the demodulation start synchronization mark detection circuit 12 of the first embodiment. Therefore, the operation inclusive of the operation of the peak shift permission 3-bit comparator circuit shown in FIG. 5 will be explained with reference to FIG. 4.

The to-be-demodulated data f and its synchronization clock g are inputted to the 48-bit shift register 20. Sets of register outputs each comprising three register outputs among 48 register outputs of the 48-bit shift register 20 are inputted in due order to the 3-bit comparators 21 to 25, 27, 29, 31 to 33 and 35 and to the peak shift permission 3-bit comparator circuits 26', 28', 30', 34', 36' (the comparators 26, 28, 30, 34, 36 in FIG. 4 which are re-written to those in the circuit diagram of FIG. 5), respectively. They are compared with the 48-bit demodulation start synchronization pattern shown in FIG. 3B for every three bits by the eleven 3-bit comparators 21 to 25, 27, 29, 31 to 33 and 35 and by the five peak shift permission 3-bit comparator circuits 26', 28', 30', 34', 36' whenever the clocks advance one by one, and two each of these coincidence outputs of the sixteen circuits are inputted to the eight 1-bit full adders 37 to 44. The full adders 37 to 51 calculate the sums, respectively, to calculate the coincidence number of the sixteen 3-bit comparators 21 to 25, 27, 29, 31 to 3, 35, 26', 28', 30', 34', 36'. The sum output of the 4-bit full adder 51 at the final stage is inputted to the 4-bit comparator 52. The carry output of the 4-bit full adder 51 (which output becomes active when all of the eleven 3-bit comparators 21 to 25, 27, 29, 31 to 33, 35 coincide with one another and all the outputs of the five peak shift permission 3-bit comparator circuits 26', 28', 30', 34', 36' become active) is inputted to the OR gate 53. The 4-bit comparator 52 compares the sum input value from the 4-bit full adder 51 with the real number "15" and inputs the coincidence output to the OR gate 53. The OR gate 53 outputs the carry output of the 4-bit full adder 51 or the coincidence output of the 4-bit comparator 52 as the demodulation start instruction c. Accordingly, the 48 bits of the to-be-demodulated data f are checked for each clock of the clock synchronization PLOSYNC 15, and the demodulation start instruction c becomes active when at least 15 of the 16 sets of bits obtained by dividing the 48 bits of the to-be-demodulated data f by 3 bits are coincident with the demodulation start synchronization mark (five sets among the 16 sets permit the 1-bit peak shift).

According to the second embodiment described above, five sets of the three-bit comparators 26, 28, 30, 34, 36 at the positions corresponding to the change positions of the frequency in the demodulation start synchronization mark in the demodulation start synchronization mark detection circuit 12 of the first embodiment are replaced by the peak shift permission 3-bit comparators 26', 28', 30', 34', 36'. In this way, the detection failure ratio of the demodulation start synchronization mark or in other words, the occurrence ratio of the defective sector resulting from failure of demodulation, can be much more improved than in the first embodiment.

As described above, the present invention uses the pattern in which a plurality of pulse trains functioning as the demodulation start synchronization mark, having a frequency twice that of the clock synchronization PLOSYNC but having mutually different pulse numbers are dispersedly arranged in the pulse trains having the same frequency as that of the clock synchronization PLOSYNC, and also uses, as means for detecting the demodulation start synchronization mark, means which confirms coincidence of the pattern in the time unit of one period of the pulse trains of the clock synchronization PLOSYNC and recognizes the pattern as the demodulation start synchronization mark by complete coincidence with the demodulation start synchronization mark or by coincidence of at least a predetermined number of pulses. Accordingly, the present invention can accomplish an excellent magnetic disk device capable of drastically reducing the occurrence ratio of the defective sector resulting from failure of demodulation.

According to the present invention, the means for detecting the demodulation start synchronization mark described above includes means for permitting the shift of one bit in front and at the back of the reproduction pulse at the frequency change position in the demodulation start synchronization mark. For this reason, the magnetic disc device of the present invention can reduce the number of failure at the time of the detection of the demodulation start synchronization mark by the peak shift, so that the detection failure ratio of the demodulation start synchronization mark, or in other words, the occurrence ratio of the defective sector resulting from failure of demodulation, can be further improved.

We claim:

1. A magnetic disk reading apparatus utilizing a modulation/demodulation system for recording and reproducing data wherein a data field of a recorded sector includes a demodulation start synchronization mark, indicative of a demodulation start position of said data field, having a predetermined pulse train pattern including (i) a first plurality of pulse trains having a frequency equal to one half of frequency of a clock synchronization PLOSYNC signal, and (ii) a second plurality of pulse trains, interspersed with said first plurality of pulse trains, having a frequency equal to said frequency of said clock synchronization PLOSYNC signal, said apparatus comprising:

(a) means for demodulating data recorded in said data field of said recorded sector in accordance with a demodulation start signal;

(b) means, for generating said demodulation start signal, comprising means for (i) detecting said demodulation start synchronization mark, (ii) dividing said demodulation start synchronization mark into N blocks during one period of said PLOSYNC signal, (iii) determining whether said block-divided demodulation start synchronization mark completely coincides with said predetermined pulse train pattern, (iv) determining whether a predetermined number M (M<N) of said blocks of said block-divided demodulation start synchronization mark coincide with said predetermined pulse train, and (v) generating said demodulation start signal when either said block-divided demodulation start synchronization mark completely coincides with said predetermined pulse train pattern or said predetermined number M of said blocks of said block-divided demodulation start synchronization mark coincides with said predetermined pulse train pattern.

2. A magnetic disk reading apparatus according to claim 1, wherein said means for determining whether said predetermined number M (M<N) of said blocks of said block-divided demodulation start synchronization mark coincide with said predetermined pulse train determines that said predetermined number M of said blocks do coincide when said demodulation start synchronization mark includes a one bit shift at a beginning or end thereof.

3. A magnetic disk reading apparatus according to claim 1, further comprising means for reading data from said recorded sector, separating said PLOSYNC signal therefrom, and supplying said demodulation start synchronization mark and recorded data to said demodulation means and said demodulation start signal generating means.

4. A magnetic disk reading apparatus according to claim 1, further comprising error correction means, operatively associated with said demodulating means, for performing error correction on said data demodulated by said demodulation means.

5. A magnetic disk reading apparatus according to claim 2, further comprising means for reading data from said recorded sector, separating said PLOSYNC signal therefrom, and supplying said demodulation start synchronization mark and recorded data to said demodulation means and said demodulation start signal generating means.

6. A magnetic disk reading apparatus according to claim 2, further comprising error correction means, operatively associated with said demodulating means, for performing error correction on said data demodulated by said demodulation means.

7. A magnetic disk reading apparatus according to claim 2, further comprising means for reading data from said recorded sector, separating said PLOSYNC signal therefrom, and supplying said demodulation start synchronization mark and recorded data to said demodulation means and said demodulation start signal generating means.

* * * * *